United States Patent [19]

Ohashi et al.

[11] Patent Number: 5,186,890

[45] Date of Patent: Feb. 16, 1993

[54] REACTOR CORE OF FAST BREEDER REACTOR, COMPONENTS OF SAME, AND REGULATING METHOD OF COOLANT DISTRIBUTION OF SAME

[75] Inventors: Masahisa Ohashi; Shusaku Sawada, both of Hitachi; Motomu Sogame, Mito; Yoshiaki Oomasa, Hitachi; Kunikazu Kaneto, Katsuta, all of Japan

[73] Assignee: Hitachi, Ltd., Tokyo, Japan

[21] Appl. No.: 663,432

[22] Filed: Mar. 1, 1991

[30] Foreign Application Priority Data

Mar. 2, 1990 [JP] Japan .................. 2-49275

[51] Int. Cl.$^5$ .............................................. G21C 3/32
[52] U.S. Cl. ...................................... 376/434; 376/445
[58] Field of Search ............... 576/434, 445, 439, 436; 976/DIG. 58, DIG. 59, DIG. 60, DIG. 61

[56] References Cited

U.S. PATENT DOCUMENTS

3,575,808  4/1971  Jakub et al. ..................... 376/436
4,097,331  6/1978  Betten ............................ 376/434
4,970,047 11/1990  Ueda et al. ..................... 376/443

Primary Examiner—Donald P. Walsh
Assistant Examiner—Frederick H. Voss
Attorney, Agent, or Firm—Antonelli, Terry, Stout & Kraus

[57] ABSTRACT

A fuel containment containing nuclear fuel rods of a fuel assembly which will be loaded into a reactor core of a fast breeder reactor is formed narrow in width at middle portion of vertical direction and long in length of vertical direction. And as being used in the reactor core, the middle portion of vertical direction of the fuel containment, wherein both of heat generation and swelling are larger than that of other portion, expands more than other portion, but undesirable contact with adjacent fuel assemblies can be avoided as the middle portion is previously formed narrow. Moreover, the other portions, wherein expansion of the fuel containment and undesirable contact with adjacent fuel assemblies are barely caused, are formed previously wide in width by enlarging the coolant flow path of the fuel containment, whereby pressure drop of coolant of coolant used in the reactor core can be reduced.

12 Claims, 3 Drawing Sheets

REACTOR CORE OF FAST BREEDER REACTOR, COMPONENTS OF SAME, AND REGULATING METHOD OF COOLANT DISTRIBUTION OF SAME

BACKGROUND OF THE INVENTION

The present invention relates to a nuclear fuel assembly for a fast breeder reactor, a reactor core wherein the nuclear fuel assembly is used as one of components, and a regulating method of coolant distribution of the reactor core, especially, to the core which is preferable to reduce a pressure drop of coolant of the reactor core of the fast breeder reactor and to improve thermal characteristics of the reactor core.

Figure 3:
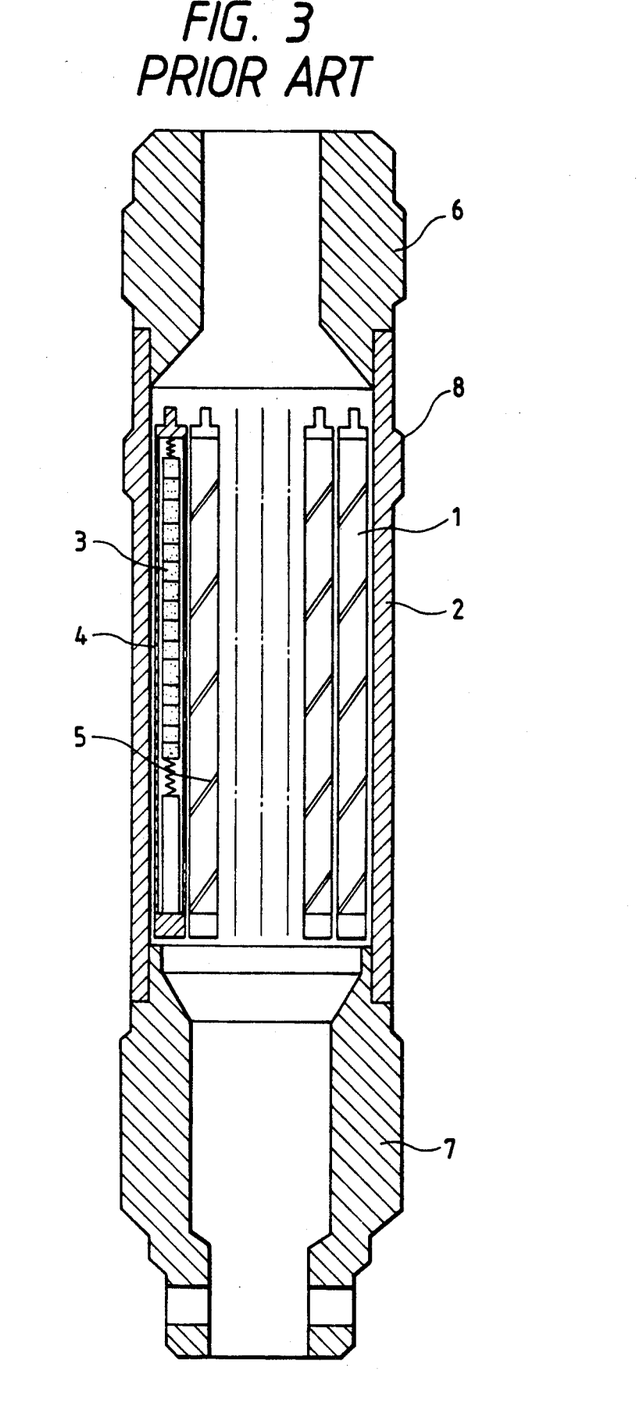
FIG. 3 is a vertical cross section of a conventional fuel assembly for a fast breeder reactor.

As illustrated in FIG. 3, a nuclear fuel assembly (hereinafter called a fuel assembly) for a fast breeder reactor of the prior art was generally of a type of a fuel assembly which was composed of a wrapper tube 2 wherein a plurality of nuclear fuel rods 1 were arranged in triangle lattices with wire spacers 5 or grid spacers between an upper shield 6 and a lower shield 7. The fuel rod was composed of a cladding tube 4 with a small diameter containing a stack of nuclear fuel pellets 3. The wrapper tube 2 has a uniform inner width in all through the axial direction (vertical direction) of the fuel assembly. The reactor core of the fast breeder reactor was composed of a plurality of the fuel assemblies which were standing together vertically in the core region.

The nuclear fuel pellets 3 can be divided into a blanket fuel pellet for breeding and a driver fuel pellet for driving the reactor. The blanket fuel pellets are inserted into each of an upper and a lower blanket region of the cladding tube 4, and the driving fuel pellets are inserted into a core region of the cladding tube 4. A gas plenum portion is formed at lower portion lower than the lower blanket portion of the cladding tube 4.

A fuel assembly having a wrapper tube free structure wherein a structural material other than a part of or all of the wrapper tube 2 is deleted is also known.

A reactor core is composed of a plurality of fuel assemblies which are standing together vertically in coolant. The fuel assembly comprises a plurality of nuclear fuel rods and a wrapper tube as a means of fuel containment.

As for a reactor other than a fast breeder reactor, a technique for a boiling water reactor was disclosed in the JP-A-1-98994 (1989) and the JP-A-59-180389 (1984). The technique described above is close to the present invention in a point of an altered inner width of a nuclear fuel rod container (which is called a channel box in the technical field of the boiling water reactor). In the technique disclosed in the JP-A-1-98994 (1989), an inner width of the channel box is enlarged at a down-stream side of coolant while an outer width is maintained uniform. In the technique disclosed in the JP-A-59-180389 (1984), both of an inner and outer width of a channel box is enlarged continuously from an up-stream side of the coolant to a down-stream side of coolant in a reverse tapered shape.

As general characteristics of a type of fuel assembly which had a wrapper tube 2 like a fuel assembly for a fast breeder reactor, the fuel assembly had to have a structure to wrap around a plurality of nuclear fuel rods 1 having a small diameter with a wrapper tube 2 and to settle a small gap between the fuel rods in order to make a reactor core compact and to improve a nuclear characteristics of the reactor, hence a large powered circulating pump was used for coolant circulation because of a large pressure drop of coolant of coolant flowing through a fuel bundle portion, wherein a plurality of nuclear fuel rods 1 are bundled, of the wrapper tube 2.

And the wrapper tube 2 had to have a thick wall to sustain the fuel assembly structurally and to depress expansion in horizontal direction caused by neutron radiation and pressure difference between the inner side and the outer side of the wrapper tube 2 in operation. Further, the wrapper tube had a structure to maintain a gap properly between each next wrapper tube 2 even though the fuel assembly expanded in horizontal direction as described above in composing the reactor core by standing a plurality of fuel assembly together vertically in the core region of the reactor.

One of the distinguished features of a fast breeder reactor from other type reactors is a phenomenon to cause a dislocation of chemical elements in materials of the wrapper tube and expansion at a portion of the wrapper tube (a middle portion of the wrapper tube) which is faced to a reactor fuel region by the neutron irradiation as burning of the nuclear fuel proceeds. Once the expansion is caused, as the wrapper tube has a closed shape in a horizontal section, both of the inner and the outer width of the wrapper tube are enlarged and a situation wherein a wrapper tube contacts with adjacent wrapper tubes is easily caused.

The phenomenon of expansion is called a swelling. The swelling is more distinguished in the fast breeder reactor than in other reactors, and the swelling is different from a channel creep caused by a stress which is generated by a pressure difference between an inner and an outer side of a wrapper tube in other type reactors. In the fast breeder reactor, the middle portion of the wrapper tube expands in a horizontal direction by both of the stress generated by the pressure difference and the swelling. Therefore, although the gap between each of wrapper tubes standing together vertically in the reactor core might be settled closer at regions near both ends of the wrapper tube, a large gap was settled actually in consideration of the expansion in horizontal direction at the middle portion of the wrapper tube in the fast breeder reactor. The gap between each of next wrapper tubes 2 had been maintained with a pad 8 having a larger width than the outer width of the wrapper tube 2 at the portions of the upper and the lower shield 6, 7, locations. The setting of the wrapper tube 2 and the gap between each of wrapper tubes 2 resulted in a reduction of a flow area in the fuel assembly, and had been a cause to increase pressure drop of coolant of the reactor core.

If pressure drop of coolant at the portion of fuel rod bundle in the fuel assembly can be reduced, a large reduction of pressure drop of coolant of reactor core as a whole becomes possible.

On the other hand, a fuel assembly of wrapper tube free type has less pressure drop of coolant as much as an amount of pressure drop of coolant caused by wrapper tubes, but leakage and unbalancing flow of coolant among fuel assemblies are concerned because wrapper tubes are not existing in the fuel assembly even though distribution of coolant to each fuel assemblies composing of the reactor core is regulated in corresponding to output power of the each fuel assemblies, and an investigation on the composition of the fuel assembly is necessary to resolve the concerning.

In a case wherein a technique disclosed in the JP-A-1-98994 (1989) is applied to a wrapper tube for a fast breeder reactor, a plurality of wrapper tubes have to be standing together vertically in a core region with the same large gap as a conventional reactor core in consideration of swelling etc. as the wrapper tube has a uniform outer width all through the total length from the top to the bottom without any exception at middle, upper and lower portion of the wrapper tube. Therefore, a coolant flow area in the wrapper tube has to be reduced reversely as much as a plurality of wrapper tubes occupies a wider area for standing in a limited core region with a large gap between each of wrapper tubes, and consequently, an increasing of pressure drop of coolant of the reactor core is easily induced.

In a case wherein a technique disclosed in the JP-A-59-180389 (1984) is applied to a wrapper tube for a fast breeder reactor, a lower end of the wrapper tube is reduced in width, and the reduced portion of the lower end of the wrapper tube is fixed to a member composing an inlet of coolant (equal to the lower shield in the fast breeder reactor), and the width of the reduced portion will not be enlarged even though burning of the fuel is proceeded. Therefore, the reduced portion in width is maintained all through the burning period of the nuclear fuel from the beginning to the end of the period, and will be easily a cause to increase the pressure drop of coolant of the reactor core.

Further, a technique to enlarge a width of a middle portion of a wrapper tube by placing a reverse tapered tube is equal to abandon a margin to accommodate expansion in the horizontal direction by swelling etc., which will be caused in the middle of burning period, from the beginning of the burning of the nuclear fuel as much as an amount of enlarged width, and a gap between each of the wrapper tubes has to be enlarged in order to avoid contact with adjacent fuel assemblies even though the expansion in the horizontal direction is occurred. Accordingly, a large area for the reactor core becomes necessary, and the technique is not suitable for the reactor core having a limited area.

Therefore, in the technical field of the fast breeder reactor, the development of a fuel assembly which enable to distribute flow of coolant exactly and to decrease pressure drop of coolant in a reactor core having a small area as possible has been desired.

SUMMARY OF THE INVENTION

The first object of the present invention is to provide a low pressure drop of coolant type fuel assembly which enables to distribute flow of coolant of a fast breeder reactor exactly and to decrease pressure drop of coolant of a reactor core without enlarging the area of the reactor core as possible; the second object of the present invention is to provide a reactor core of the fast breeder reactor which enables to distribute flow of coolant exactly and to decrease the pressure drop of coolant of the reactor core without enlarging the area of the reactor core as possible; the third object of the present invention is to provide a means of fuel containment of the fast breeder reactor for reduction of the pressure drop of coolant of the fuel assembly; and the fourth object of the present invention is to provide a method to regulate the distribution of coolant in the fast breeder reactor which is effective to reduce difference of thermal output power among each of reactor core regions by using the fuel assembly described above.

To achieve the first object described above, there is provided a first feature of is a fuel assembly for a fast breeder reactor comprising a plurality of nuclear fuel rods which are arranged in a means of fuel containment characterized that the means of fuel containment is a fuel assembly having a shape which is narrow in both inner and outer width at a middle portion of the means, and on the contrary, relatively wide in both inner and outer widths at closer portions to each of both ends of the means of fuel containment.

In the present invention, the middle portion of the means which is faced to the middle portion of the nuclear fuel rods wherein temperature is high and irradiation dose is large shows a tendency to have a larger expansion coefficient in the horizontal direction than the closer portions to each of both ends of the means in reactor operation, and in considering of relatively small expansion coefficient at both ends portion, a larger width than a conventional width can be applicable to the both ends portion for reducing flow resistance of coolant through the means of fuel containment in reactor operation, and as the width of the middle portion of the means will be expanded and enlarged during use in reactor operation, an effect to reduce flow resistance along whole length of the means of fuel containment is obtained, and moreover the exact distribution of coolant is maintained as same as the conventional means because that the coolant flows through the means of fuel containment does not disperse to the externals.

A second feature to achieve the first object described above is a fuel assembly for a fast breeder reactor comprising a plurality of nuclear fuel rods which are contained in a means of fuel containment characterized that the means of fuel containment is a fuel assembly of which shape is narrow in width between both of each inner faces and outer faces at a portion of the means which has larger swelling than another portion of the means, and by the second feature, a middle portion of the means of fuel containment where swelling is easily caused has a narrower width than another portion for accommodating the expansion by swelling and for preventing a mutual interference between fuel assemblies which are used in standing together in the reactor core after the expansion, on the other hand, other portion of the means where the swelling is relatively difficult to be caused has a wider width than a conventional means by utilizing a space for preventing the fuel assembly from a mutual interference with adjacent fuel assemblies caused by the expansion with swelling of the middle portion of the means, and consequently the means of fuel containment has a reduced flow resistance for coolant which flow through the means of fuel containment.

A third feature to achieve the first object described above is a fuel assembly for a fast breeder reactor comprising a plurality of nuclear fuel rods which are contained in a means of fuel containment characterized that the means of fuel containment is a fuel assembly of which shape is narrower in width between both of each inner faces and outer faces at least at a portion of the means facing to a reactor core fuel portion of the nuclear fuel rod with respect to another portion of the means not facing to the reactor core fuel portion of the nuclear fuel rod, and by the third feature, temperature at the reactor core fuel portion of the nuclear fuel rod will be raised to the highest in use of the fuel assemblies standing together in the reactor, and the portion of the means facing to the reactor core fuel portion of the nuclear fuel rod expands wider than another portion of the means, but even though the expansion is caused, the portion of the means where the expansion is caused has the same narrow width as a conventional means for accommodating the expansion and will not cause any interference with adjacent fuel assemblies, and the another portion of the means has previously wider width than a conventional means by utilizing a space for preventing the fuel assembly from a mutual interference with adjacent fuel assemblies caused by the expansion, and consequently the means of fuel containment has a reduced flow resistance for coolant which flow through the means of fuel containment.

A fourth feature to achieve the second object described above is a reactor core of a fast breeder reactor comprising a plurality of nuclear fuel assemblies standing together vertically in a reactor vessel which contains coolant characterized that at least one of the fuel assemblies is a fuel assembly for the fast breeder reactor relating at least to one of the features described above, as the flow resistance of coolant which flow through the fuel assembly is reduced, the reactor core itself of the nuclear reactor which comprises the fuel assembly as an element of the invention has an effect to reduce a pressure drop of the coolant flowing through the reactor core, and a distribution balance of coolant is still maintained because the distributed coolant flow essentially in a space surrounded with the means of fuel containment.

A fifth feature to achieve the second object described above is the reactor core of the fast breeder reactor relating to the fourth feature is characterized in being loaded with the fuel assembly which is related to at least one of the features described above to a region of the reactor core wherein a relatively large output power is generated, and in addition to the effect brought by the fourth feature, as the fuel assembly having the reduced pressure drop of coolant is loaded into the region of the reactor core wherein the relatively large output power is generated, an effect that cooling by coolant is intensified and keeping thermal balance with surrounded thermal output power becomes easy is obtained.

A sixth feature to achieve the third object described a means of fuel containment for a fast breeder reactor characterized in having a shape that the width of the middle portion of the means is narrow in both of inner and outer widths, and on the contrary, portions closer to each of both ends have a wider width than the middle portion in both of inner and outer widths, and the means of fuel containment has an enlarged width which enables to have a large flow area for reducing pressure drop of coolant at a portion which has a relatively smaller thermal expansion coefficient than the middle portion of the means in reactor operation, and the middle portion of the means of fuel containment gradually expands the width during the reactor operation, but as the expansion is expected previously and the width at the middle portion of the means is not enlarged, any interference between adjacent fuel assemblies would not be occurred in reactor operation, and moreover, owing to the enlargement of the flow area of the coolant with the thermal expansion of the width of the middle portion of the means of fuel containment during the reactor operation, the pressure drop of coolant owing to the means is reduced and hence an effect to reduce the pressure drop of coolant of the fuel assembly is obtained by using the means of fuel containment relating to the present invention.

A seventh feature to achieve the first object described above is the fuel assembly for the fast breeder reactor is characterized in having a thinner wall thickness at a portion of the means of fuel containment which faces to the gas plenum portion of the nuclear fuel rod than the wall thickness of the middle portion of the means whereof a width between both of the inner and the outer faces respectively are narrower than the width of another portion, and as the gas plenum portion has a lower temperature and less irradiation dose than the portion where the nuclear fuel exists, the wall thickness at the portion of the means of fuel containment faced to the gas plenum portion of the nuclear fuel rod could be less than the wall thickness of other portion, and the wall thickness at the portion faced to the gas plenum portion can be reduced and an effect to reduce pressure drop of coolant of coolant by enlarging the flow area of coolant in the means of fuel containment as much as equivalent to the reduction in the wall thickness is obtained.

An eighth feature to achieve the first object described above is the fuel assembly for the fast breeder reactor is characterized in having a shape that the width of the means of fuel containment is enlarged wider continuously from the middle portion of the means as closing toward the both ends of the means of fuel containment, and as the thermal expansion coefficient becomes continuously smaller as closing toward the both ends of the means even in middle portion of the means, the width of the means of fuel containment can be enlarged as much as equivalent to the decreasing of the thermal expansion coefficient and an effect to reduce pressure drop of coolant of coolant flowing through the means of fuel containment is obtained in addition to the effect of the first feature.

A ninth feature to achieve the first object described above is the fuel assembly for the fast breeder reactor is characterized in having a shape that a wall thickness of the means of fuel containment becomes thinner as closing toward the both ends of the means in middle portion of the means, and in as the wall thickness of the means is reduced continuously according to the thermal expansion coefficient of the portion is decreased, the flow area of coolant in the means can be enlarged and an effect to reduce pressure drop of coolant of coolant is obtained in addition to the effect of the first feature.

An tenth feature to achieve the fourth object is a method to regulate flow distribution of coolant in a reactor core of a fast breeder reactor which comprises composing the reactor core with a plurality of fuel assemblies standing together vertically in a reactor vessel which contains coolant, and making a difference of thermal output of each reactor core region preferable by distributing flow of the coolant to each of the fuel assemblies in the reactor depending on the difference of thermal output of the each reactor core region, characterized in comprising the steps of enlarging the flow area of coolant of the means of fuel containment at both portions close to both ends of the means, reducing the flow area of coolant of the means of fuel containment relatively small at middle portion of the means facing to the portion of reactor core fuel portion of a nuclear fuel rod, and regulating the flow distribution of coolant by changing the enlarging rate of the flow area of coolant, and, as a value of pressure drop of coolant which flow through the means of fuel containment can be fixed by the enlarging rate of the flow area of coolant of the means of fuel containment, a flow rate of the coolant is fixed depending on the enlarging rate, and consequently, the flow distribution of coolant can be regulated. In utilizing the method to regulate the flow distribution as described above, the difference of thermal output of the each reactor core region can be fixed preferably.

DESCRIPTION OF PREFERRED EMBODIMENTS

In the embodiment described hereinafter, the finding that a limitation of outer size of a wrapper tube becomes critical at a portion of the wrapper tube which faces to nearly the middle of a nuclear fuel stack in a nuclear fuel rod, and that both upper and lower portions from the critical portion have spaces to accommodate some expansion was obtained with fundamental consideration on thermal output power and removal of the thermal output power in a reactor core of a fast breeder reactor and investigation on elimination of useless space in a conventional fuel assembly for the fast breeder reactor, and a fuel assembly which comprises a wrapper tube having a reverse tapered shape in both outer and inner width from the portion which faces to the middle of the nuclear fuel stack in the nuclear fuel rod toward both upper and lower ends of the wrapper tube was devised.

In considering of horizontal expansion of the wrapper tube caused by swelling etc. during the reactor operation, while a uniform gap between each wrapper tubes is necessary to be maintained at the middle portion of the reactor core fuel stack, that is a heat generation part of a nuclear fuel rods bundle, the gap between each wrapper tubes can be reduced in other portions. According to the understanding described above, a pressure drop of coolant can be reduced by enlarging a flow area of coolant by reducing the gap between the wrapper tubes at the portion other than the middle portion of the reactor core fuel stack and enlarging both of the outer and inner width of the wrapper tube larger than the width at the middle portion of the reactor core fuel stack in considering that the enlargement of the wrapper tube at a portion which faces to the gas plenum portion of the nuclear fuel rod, that is no heat generating part, does not have any problem in heat removal.

Especially, a fuel assembly for a fast breeder reactor has a trend to be longer in length with advancement of nuclear fuel for high burnup, and the present invention can contribute preferably to the reduction of head loss of the fuel assembly described above.

Hereinafter, embodiments of the present invention wherein the invention were applied to fuel assemblies for the fast breeder reactor are described in detail in referring FIG. 1 and 2.

Figure 1:
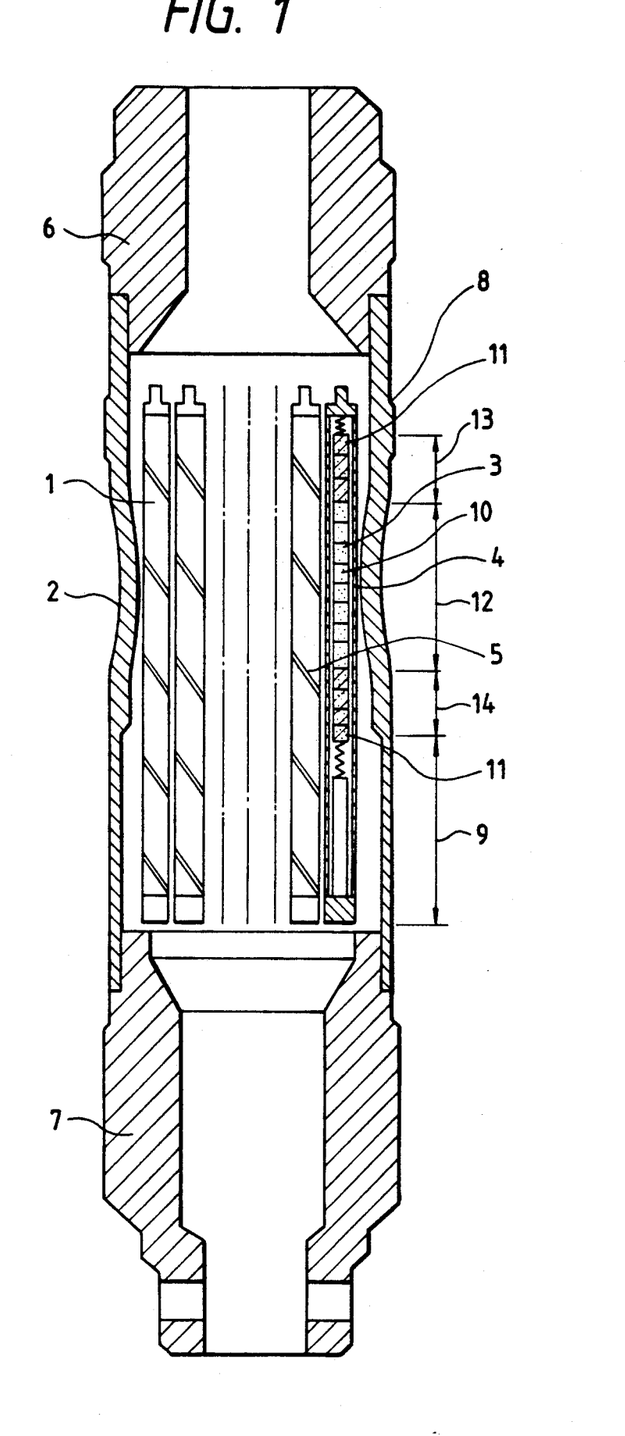
FIG. 1 is a vertical cross section of the fuel assembly for the fast breeder reactor relating to an embodiment of the present invention.

FIG. 1 is a vertical cross section of a fuel assembly related to an embodiment of the present invention. In FIG. 1, 271 fuel rods 1 having a small diameter are bundled and inserted into a wrapper tube 2, a means of fuel containment. In the bundling of the fuel rods, the external surface of the cladding 4 of each fuel rod 1 is wound with a wire spacer 5 to keep a constant gap between adjacent fuel rods.

The fuel rod 1 having a small diameter is composed of a stack of fuel pellets 3 inserted into a cladding 4. A gas plenum portion to accommodate gas pressure which is generated with burning of the fuel pellets 3 is formed in the lower part of the cladding 4. While, fuel pellets 3 are consisted with two type of fuels, driver fuel pellets 10 and blanket fuel pellets 11, and the driver fuel pellets 10 are stacked in the reactor core region 12 which is a heat generating region and the blanket fuel pellets 11 are stacked in each of upper and lower blanket region 13, 14.

At the upper end of the wrapper tube 2, an upper shield 6 for neutrons is fixed by welding, and a lower shield 7 is fixed by welding in a same way at the lower end of the wrapper tube 2. The lower shield 7 has an inlet for coolant conducting to the inside of the wrapper tube 2, and the upper shield 6 has an outlet for coolant.

The outer diameter of the fuel rod 1 is 7.6 mm, and the minimum inner and outer width between faces of the portion of the fuel assembly 2 coincident to the portion of the fuel pellets stack (at the middle of the fuel pellets stack) are 150 mm and 158 mm. And the arrangement pitch between the wrapper tubes 2 which are composing the reactor core by standing together vertically in the reactor is 164 mm.

As shown in FIG. 3, a wrapper tube 2 of a conventional fuel assembly has a uniform inner and a uniform outer width which are partly enlarged at positions of pads 8 for restriction of fuel assemblies at the outer side of upper blanket fuel portion. On the other hand, an embodiment of the present invention is characterized in a wrapper tube 2 of a fuel assembly having both of a partly larger inner width and a partly larger outer width at positions facing to upper and lower part of a reactor core region 12 than an inner and outer width at a position facing to the reactor core region 12.

In the present embodiment, the inner and the outer width of the wrapper tube 2 at the portion facing to the gas plenum part 9 are 154 mm and 162 mm each, and the minimum inner and the outer width or diameter of the wrapper tube 2 at the portion facing to the reactor core region 12 are 150 mm and 158 mm. And the wrapper tube 2 has a shape having both of the inner and the outer widths or diameters enlarged continuously and gradually from the minimum inner and outer width or diameter to 154 mm, and 162 mm respectively, so that the wrapper tube may be considered to have an hourglass shape.

Consequently, in the embodiment of the present invention, the pressure drop of coolant of the fuel assembly relating to the present invention could be reduced about 29% as compared with the pressure drop of coolant of the conventional fuel assembly for the fast breeder reactor as shown in Table 1.

And a reactor core comprising the fuel assembly having the reduced pressure drop of coolant as an element consequently has a reduced pressure drop of coolant as a whole, and a capacity of a pump which circulates coolant to the reactor core can be reduced. Further, the reduction of the capacity of the pump makes it possible to use a smaller pump, and hence, a reduction in size of the reactor vessel of the fast breeder reactor including the small pump becomes possible.

Moreover, the reduction of the pressure drop of coolant of the reactor core enhances natural circulation of coolant in the reactor core after stopping the operation of the pump, and the enhancement of the natural circulation of coolant can contribute to cooling of the reactor core and raises safety of the reactor.

TABLE 1

| Fuel Assembly | Prior art | Present invention |
|---|---|---|
| Length in axial direction (mm) | | |
| Upper blanket portion | 300 | 300 |
| Reactor core fuel stack portion | 1000 | 1000 |
| Lower blanket portion/ Gas plenum portion | 1700 | 1700 |
| Inner width of wrapper tube (mm) | | |
| Upper blanket portion | 150 | 154 |
| Middle of fuel stack portion | 150 | 150 |
| Upper and lower ends fuel stack portion | 150 | 154 |
| Gas plenum portion | 150 | 154 |
| pressure drop of coolant | | |
| (kg/cm$^2$) | 3.8 | 2.7 |
| (%) | 100 | 71 (Reduced 29%) |

In the embodiment of the present invention, enlargement of the width by expansion of the wrapper tube 2 is done all over the outer fringe, but in case of a wrapper tube having a hexagonal horizontal cross section, it is possible to increase structural strength of the wrapper tube by leaving thick wall thickness only at portions of the hexagonal corners of the wrapper tube 2 as it is without an enlarging procedure.

And in the embodiment of the present invention, expansion of the width of the wrapper tube 2 is done at the portion faced to the gas plenum portion 9, but as the expansion of the wrapper tube 2 by burning of nuclear fuel at the portion faced to the lower blanket portion 14 is smaller than the expansion at the portion of the wrapper tube 2 faced to the reactor core region 12, it is possible to enlarge the width of the wrapper tube 2 and the portion faced to the lower blanket portion just as same as the expansion at the portion faced to the gas plenum 9 portion. The present case is effective especially for the reduction of pressure drop of coolant at the region of 1.7 meters in 3 meters of the total length of the fuel rod.

Further, in the embodiment of the present invention, the gas plenum portion 9 is provided at the lower part of the reactor core region 12, but in a case when the gas plenum portion 9 is placed at upper part of the reactor core region 12, the present invention also can be applicable.

And the fuel assembly related to the present invention has an effect to enable to distribute coolant flow to the reactor core by being loaded into a part of the reactor core. That is, by using the enlarged wrapper tube 2 related to the present invention for the fuel assembly in the high power region of the reactor core and regulating of pressure drop of coolant at the fuel portion of the reactor core by changing the enlarging rate of the width of the wrapper tube depending on the change of thermal output, it becomes possible to distribute the flow of coolant most properly to each region of the reactor core. As the result, it is not necessary to use extra orifices for flow distribution which are conventionally installed at the inlet portion of coolant.

Figure 2:
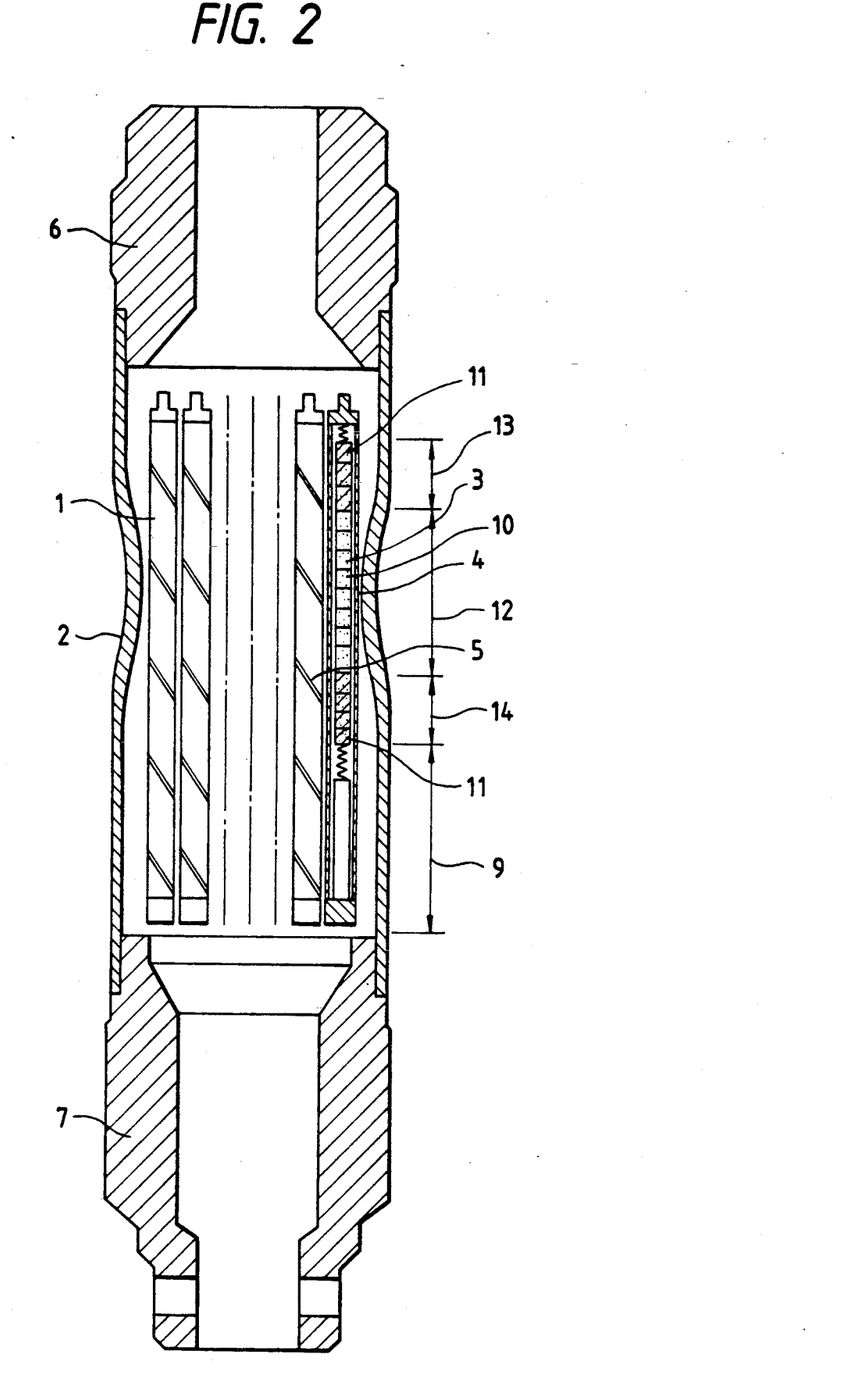
FIG. 2 is a vertical cross section of the fuel assembly for the fast breeder reactor relating to another embodiment of the present invention.

FIG. 2 is a vertical cross section of the fuel assembly for the fast breeder reactor relating to the another embodiment of the present invention. The fuel assembly shown in FIG. 2 has a wrapper tube 2 having an upper shield 6 and a lower shield 7 which are welded to the wrapper tube the same as the fuel assembly shown in FIG. 1. The outer width of the fuel rod is 7.6 mm, and the minimum inner and outer width of the wrapper tube at the portion of narrowest width of the near middle of the fuel stack portion are 150 mm and 158 mm. And the pitch of arrangement of the wrapper tubes is 164 mm.

In this embodiment, the width of the wrapper tube 2 has the minimum value at the middle of the reactor core fuel stack portion wherein the expansion of the wrapper tube 2 in horizontal direction is large, and as going up and going down to another portion (vertical direction) wherein the expansion of the wrapper tube is relatively small, the inner and the outer width of the wrapper tube 2 is continuously enlarged and the thickness of the wrapper tube 2 is reduced. The maximum inner and the outer width of the wrapper tube 2 at the portion faced to the upper and the lower blanket portion 13, 14 are 154 mm and 162 mm, and the inner and the outer width of the wrapper tube 2 at the portion faced to the most expanded gas plenum portion 9 are 158 mm and 162 mm.

Consequently, in the embodiment of the present invention, pressure drop of coolant of the fuel assembly related to the present invention can be reduced about 42% in comparison with a conventional fuel assembly for the fast breeder reactor by prior art as shown in Table 2. And the total pressure drop of coolant of the reactor core using the fuel assemblies relating to the present embodiment can be reduced as a whole. As a result, power for the coolant circulating pump can be saved, and reduction of pump size and reactor vessel becomes possible.

TABLE 2

| Fuel Assembly | Prior art | Present invention |
|---|---|---|
| Length in axial direction (mm) | | |
| Upper blanket portion | 300 | 300 |
| Reactor core fuel stack portion | 1000 | 1000 |
| Lower blanket portion/ Gas plenum portion | 1700 | 1700 |
| Inner width of wrapper tube (mm) | | |
| Upper blanket portion | 150 | 158 |
| Middle of fuel stack portion | 150 | 150 |
| Upper and lower ends fuel stack portion | 150 | 158 |
| Gas plenum portion | 150 | 158 |
| pressure drop of coolant | | |
| (kg/cm$^2$) | 3.8 | 2.2 |
| (%) | 100 | 58 (Reduced 42%) |

In all of the present embodiments, a portion of a wrapper tube 2 faced to a reactor core region 12 is exposed to the environment of the highest temperature during reactor operation and is yielded the largest swelling. Therefore, in considering that the portion of the wrapper tube 2 faced to the reactor core region 12 has the largest swelling, the width of the portion is determined as nearly equal to a width of a conventional wrapper tube which is less than the maximum width of the wrapper tube. With the method described above, even though the width of the wrapper tube 2 is expanded horizontally at the portion faced to the reactor core region 12, any of mutual interference accident with adjacent wrapper tubes will not be occurred. And as the other portion of the wrapper tube 2 except the portion faced to the reactor core region 12 has small expansion coefficient, any of mutual interference with adjacent wrapper tubes will not be occurred even though the width of the wrapper tube 2 is enlarged. Accordingly, the reactor core having the fuel assembly relating to the embodiment of the present invention as an element, it is not necessitated to widen the gap between fuel assemblies, and enlarging of the reactor size is not necessary.

In all of the present embodiments, an effect to use distributed coolant without any leakage, and to provide a fuel assembly for a fast breeder reactor which enable to reduce the pressure drop of coolant of the reactor core without any enlarging in size in composing of the reactor core of the fast breeder reactor is produced.

By composing of a reactor core with a plurality of fuel assemblies, which are manufactured in any of the embodiments of the present invention, standing together vertically in the reactor core of a fast breeder reactor, an effect to provide the reactor core for the fast breeder reactor which enable to use distributed coolant to each of fuel assemblies without any leakage, and to reduce pressure drop of coolant of the reactor core without enlarging the size of the reactor core is obtained.

By loading at least one fuel assembly which is manufactured in any of the embodiments of the present invention into a reactor core region, wherein the thermal output is relatively large, of the fast breeder reactor for increasing coolant flow at the region, an effect to average the thermal output of the reactor core is obtained.

In the embodiments of the present invention, even though the minimum width portion of the wrapper tube, which is a means to contain fuel rods, has the same width as of the conventional wrapper tube, the width of another portion of the wrapper tube is larger than the width of the conventional wrapper tube, and an effect to provide a means of fuel containment which can contribute to achieve reduction of pressure drop of coolant of the fuel assembly for the fast breeder reactor without enlarging the size of the reactor core together with preventing the fuel assembly from contact with adjacent fuel assemblies by expansion with swelling of the wrapper tube during reactor operation is obtained.

Especially in the embodiment of the present invention wherein the wall thickness of the means of fuel containment is reduced at the portion which faces to the gas plenum portion, in addition to an effect to provide a fuel assembly for the fast breeder reactor which is able to use distributed coolant for cooling of the reactor core without leakage and to reduce the pressure drop of coolant of the reactor core without enlarging the core size in the composition of the reactor core of the fast breeder reactor, another effect to provide the fuel assembly for the fast breeder reactor which is able to reduce further the pressure drop of coolant of the reactor core by enlarging of coolant flow area as much as equivalent to the reduction of wall thickness of the means of fuel containment are obtained.

Especially in the embodiment of the present invention wherein the width of the means of fuel containment increases continuously from the middle of the axial length of the means to both ends of the means, in addition to an effect to provide a fuel assembly for the fast breeder reactor which is able to use distributed coolant for cooling of the reactor core without leakage and to reduce the pressure drop of coolant of the reactor core without enlarging the core size in the composition of the reactor core of the fast breeder reactor, another effect to provide the fuel assembly for the fast breeder reactor which is able to reduce the pressure drop of coolant of the reactor core even at the middle of the axial length of the means of fuel containment because of enlarging of the coolant flow area continuously from the middle of the means to both ends of the means of fuel containment are obtained.

Especially in the embodiment of the present invention wherein the wall thickness of the means of fuel containment decreases continuously from the middle to both ends of the axial length of the means of fuel containment, in addition to an effect to provide a fuel assembly for the fast breeder reactor which is able to use distributed coolant for cooling of the reactor core without leakage and to reduce the pressure drop of coolant of the reactor core without enlarging the core size in composition of the reactor core of the fast breeder reactor, another effect to provide the fuel assembly for the fast breeder reactor which is able to reduce further the pressure drop of coolant of the reactor core even at the middle of the axial length of the means of fuel containment because of enlarging of the coolant flow area by reducing the extra wall thickness of the means of fuel containment are obtained.

By using a fuel assembly manufactured in one of the embodiments of the present invention as an element of the reactor core of a fast breeder reactor and designing the fuel assembly so as to have different rate of enlarging of the coolant flow area in the means of fuel containment, an effect to regulate difference in thermal output between regions in the reactor core by regulating the distribution of coolant flow between fuel assemblies composing the reactor core with the shape of the fuel assembly itself without using any other members is obtained.

What is claimed is:

1. A fuel assembly for a fast breeder reactor comprising a plurality of nuclear fuel rods, and fuel rod containment means for containing the plurality of nuclear fuels rods therein, the fuel rod containment means having an hourglass shape.

2. A fuel assembly according to claim 1, wherein the fuel rod containment means is an elongated tubular member having inner and outer diameters at a middle portion thereof which are smaller than inner and outer diameters at axial end portions thereof.

3. A fuel assembly according to claim 2, wherein a wall thickness of the fuel rod containment means at a portion adjacent a gas plenum portion of the fuel rod is thinner than a wall thickness at a middle portion of the axial length of the fuel containment means having the smaller inner and outer diameters.

4. A fuel assembly according to claim 2, wherein the fuel containment means has a shape such that a wall thickness at a portion adjacent axial end portions of the fuel containment means is thinner than a wall thickness at a portion adjacent to a middle portion of the axial length of the fuel rod containment means.

5. A fuel assembly according to claim 2, wherein the fuel rod containment means has a shape such that a diameter is larger at a portion adjacent axial ends of the fuel containment means than a diameter at a portion adjacent a middle portion of the axial length of the fuel rod containment means.

6. A fuel assembly for a fast breeder reactor comprising a plurality of nuclear fuel rods, and fuel rod containment means for containing the plurality of fuel rods therein, the fuel rod containment means having a shape so that a portion thereof subjected to a larger neutron irradiation dose than other portions thereof and causing a larger amount of swelling of the fuel rod containment means thereat than at the other portions of the fuel rod containment means has smaller inner and outer diameters at the portion subjected to the larger neutron irradiation dose than inner and outer diameters at the other portions thereof.

7. A fuel assembly according to claim 6, wherein the fuel rod containment means is a tubular member and the portion thereof having the smaller inner and outer diameters is disposed adjacent a driver fuel pellet portion of the fuel rods.

8. A fuel assembly for a first breeder reactor comprising a plurality of nuclear fuel rods, and fuel rod containment means for containing the plurality of nuclear fuel rods therein, the fuel rod containment means having a shape so that inner and outer diameters at a portion thereof adjacent to a portion of the fuel rods containing driver fuel pellets thereat is smaller than inner and outer diameters of other portions of the fuel rod containment means which are adjacent portions of the fuel rods not containing driver fuel pellets thereat.

9. A reactor core of a fast breeder reactor comprising a plurality of fuel assemblies disposed adjacent one another and extending vertically in a reactor vessel containing coolant, at least one of the fuel assemblies being a fuel assembly according to one of claims 1, 2, 6 and 8.

10. A reactor core according to claim 9, wherein the at least one of the fuel assemblies is disposed in a region of the reactor core generating relatively high thermal output power.

11. Apparatus for containing a plurality of nuclear fuel rods for a fuel assembly of a fast breeder reactor comprising an elongated tubular member having an hourglass shape, the tubular member having inner and outer diameters at a middle portion of an axial length thereof smaller than inner and outer diameters at axial end portions thereof.

12. A method of regulating distribution of coolant in a reactor core of a fast breeder reactor comprising the steps of:
  composing the reactor core of the fast breeder reactor with a plurality of fuel assemblies adjacent one another and extending vertically in a reactor vessel which contains coolant;
  distributing coolant flow among each of the fuel assemblies in the reactor core in dependence upon a difference of thermal output power of respective regions in the reactor core;
  optimizing the difference of thermal output power by regulating the distribution of coolant flow by providing at least one of the fuel assemblies with a fuel rod containment means for containing fuel rods therein and having a shape so that the inner and outer diameters at a middle portion of an axial length of the fuel rod containment means is smaller than inner and outer diameters at axial end portions thereof whereby a width of a coolant flow path at least at the middle portion of the fuel containment means is relatively reduced with respect to a width of a coolant flow path at axial end portions of the fuel rod containment means; and
  regulating the distribution of coolant flow by changing a rate of enlargement of the width of the coolant flow path of the fuel containment means of respective fuel assemblies.

* * * * *